Feb. 14, 1967  L. SPERRY  3,304,472
VARIABLE CAPACITOR
Filed April 28, 1965
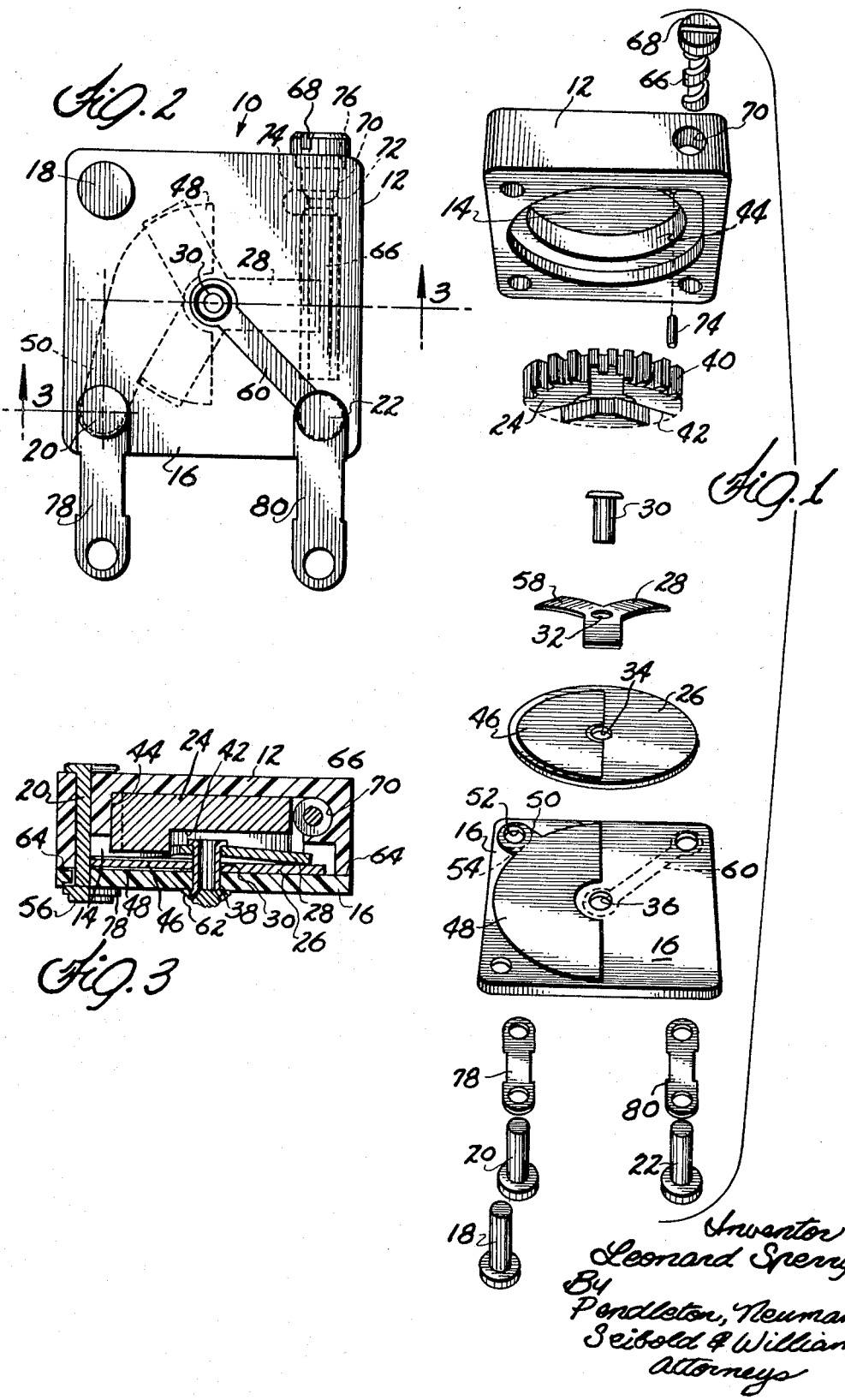

United States Patent Office 3,304,472
Patented Feb. 14, 1967

3,304,472
VARIABLE CAPACITOR
Leonard Sperry, Milwaukee, Wis., assignor to Globe-Union Inc., Milwaukee, Wis., a corporation of Delaware
Filed Apr. 28, 1965, Ser. No. 451,515
12 Claims. (Cl. 317—255)

This invention relates to a variable capacitor and more particularly to an improved enclosed precision variable capacitor with vernier adjustment.

Variable capacitors are employed extensively in electronic circuits as tuning devices and devices for trimming the impedance characteristics of associated circuits. Generally the variability is attained by moving one capacitor plate relative to the other by rotation, sliding or the like. In certain precision circuits it is desirable to provide a relatively uniform relationship between the relative position of the movable member and the total capacitance. The degree of precision with which this relationship is controlled generally determines the cost and complexity of the unit. Moreover, in sensitive or critical circuits it is desirable to provide variable capacitors which are isolated from contamination by their environment and in some cases are hermetically sealed. Furthermore, precision adjustment of the capacitance of the device and control of the capacitance without backlash through an external adjustment are highly desirable.

Heretofore the characteristics described above were attainable in expensive cylindrical devices wherein the substrate was most commonly glass. Such devices lacked optimum temperature stability and compactness.

It is one object of this invention to provide an improved variable capacitor which is enclosed and provided with means for accurate capacitance adjustment.

It is another object of this invention to attain the above described desideratum of precision adjustability and stability in a small and relatively inexpensive construction.

Another object of this invention is the improvement of temperature characteristics in a sealed, vernier adjustable capacitor by providing selectivity in temperature coefficients resulting from selection of an appropriate ceramic dielectric.

Further and additional objects of this invention will become manifest from a consideration of this description, the appended claims, and the accompanying drawings.

In one form of this invention a molded plastic housing is provided with a central cylindrical recess which is closed with a cover to define a cavity. A capacitor plate is formed on one of the walls of the cavity and a dielectric support member is rotatably mounted with one surface against the capacitor plate. The thickness of the support member is accurately controlled and a second movable capacitor plate is formed upon the other surface of the support member. The support member is rotatably driven through a resilient spring clip from a freely mounted gear which is in turn driven from outside of the housing through a worm gear which comprises a vernier adjustment.

For a more complete understanding of the invention reference will now be made to the accompanying drawing wherein:

FIGURE 1 is an exploded view of one embodiment of the invention;

FIG. 2 is a bottom plan view of the embodiment of FIG. 1; and

FIG. 3 is a cross sectional view of the embodiment of FIG. 1 taken on the line 3—3 of FIG. 2.

Referring now to the drawing, FIG. 1 illustrates all of the parts of a small variable trimmer capacitor 10 incorporating the instant invention while the assembled relationship of the parts can be best seen in FIGS. 2 and 3. In one typical embodiment of the invention a small plastic housing 12 may be formed of a general purpose phenolic or the like. In the typical embodiment a housing one-half inch square is employed for a capacitor having a voltage breakdown in excess of 500 volts and a capacitance in the range of 5–50 picofarads. The foregoing dimensions are merely by way of example and it will be apparent that the size, voltage characteristics and capacitance can be adjusted to fit the requirements of any specified situation. A capacitor such as that specified above is especially useful as a trimmer capacitance in radio frequency apparatus where precision adjustment of capacitance is required.

The housing 12 has a central cylindrical recess 14 formed therein to receive the various movable components of the capacitor. The recess 14 is closed by a cover 16 to define a central cavity. The cover 16 is held in place over the recess 14 by three rivets or eyelets 18, 20 and 22. The rivets 20 and 22 perform dual functions as will be explained subsequently in describing the electrical components and characteristics.

The assembly of the various components within the cavity can be best understood from the exploded view (FIG. 1). There it can be seen that within the cavity defined by housing 12 and cover 16 are disposed a freely rotatable drive gear 24, a dielectric support member 26, a resilient spring clip 28 and a rivet or eyelet 30 which rotatably supports the spring clip 28 and support member 26 on the cover 16. As is apparent from FIG. 1, rivet 30 passes through a central aperture 32 in spring clip 28, an aperture 34 in support member 26, and a corresponding aperture 36 in cover 16. Rivet 30 is then staked at 38, as best shown in FIG. 3.

The drive gear 24 is formed with peripheral gear teeth 40 and three drive channels 42. The drive channels 42 are formed in one face of gear 24 to receive the three legs of spring clip 28 in driving engagement. The periphery of gear 24 conforms closely to the surface 44 of recess 14 and the gear is thereby retained in position and mounted for rotation. The gear engages the legs of spring clip 28 which is in frictional engagement with support member 26 and thus rotation of gear 24 effects rotation of spring clip 28 and consequently rotation of support member 26 as well.

A conductive capacitor plate 46 is formed on approximately one-half of support member 26. In one typical embodiment the capacitor plate 46 is applied in the form of a silver paint and is fired onto the support member 26 which is a ceramic material such as steatite. The support member 26 is initially ground to provide two smooth, flat faces and an accurate transverse dimension. The flatness and uniformity of thickness are critical factors in attaining the precision capacitance values and linearity of adjustment.

A fixed capacitor plate 48 is formed on cover 16 in a manner similar to that described above. The fixed capacitor plate 48 is preferably silver or an equally conductive metal film which is fused preferably by firing to cover 16 which may be formed of any appropriate ceramic material. The cover 16 should also be ground to provide flat, parallel surfaces. The cover 16 forms the capacitor stator as well as the cover for the housing 12. It also functions in cooperation with other parts to be described, in the formation of capacitor terminals.

In the preferred embodiment described herein a connecting film 50 is formed which joins the fixed capacitor plate 48 with an aperture 52 formed in cover 16. This connector 50 provides a terminal connection for the fixed capacitor plate. To insure reliable and low impedance termination the internal surface of aperture 52 is also plated or otherwise coated with a conductive film. Also a small annulus of conductive material 54 is formed about aperture 52 on the opposite face of plate 16. This small annulus insures intimate contact with the head 56 of rivet 20.

Termination for the rotatable capacitor plate 46 is provided through the conductive spring clip 28 and rivet 30. It is preferred that two of the three legs 58 of spring clip 28 engage the conductive plate 46 for minimum resistance. A conductive strip 60 is formed on the outer face of cover 16 to connect the outer end of rivet 30 with the rivet 22. To insure a low impedance contact between conductor 60 and rivet 30 it is preferable that solder 62 be applied to the joint therebetween. The solder may also be employed to close the internal opening within the eyelet 30 in the event that a hollow rivet or eyelet has been employed. By accurately grinding both the cover 16 and the support member 26, accurate capacitance values are attained and linear precision variation of capacitance with rotation is possible. Also by employing a ceramic material as the dielectric between the capacitor plates 46 and 48, high dielectric constant, stability and freedom from contamination and variation under ambient condition, are attained.

The housing 12 and cover 16 substantially seal the cavity defined thereby to prevent possible contamination. However, if a hermetic seal is desired, this may be readily attained by employing a gasket material or the like at the joint 64.

Manipulation of the support member 26 through the drive gear 24 is accomplished by a worm gear 66. Worm gear 66 is provided with a slotted head 68 for screwdriver adjustment and the head is received adjacent an appropriate well 70 in housing 12. As shown in FIG. 2 the worm gear 66 has a recess 72 which cooperates with a pin 74 to hold the worm gear in place in the housing. Pin 74 is preferably received in a cavity formed only partially through housing 12 and opening into recess 14. Also if the capacitor is to be hermetically sealed a packing material is disposed within the slightly enlarged recess 76. The worm gear 66 directly engages the periphery of drive gear 24 whereby the gear is rotated through teeth 40 when worm gear 66 is rotated. In the preferred form of the invention the gear ratio is 20:1 whereby ten complete turns of the worm gear are required to go from minimum to maximum capacitance. The worm gear 66 provides resistance to any vibration or motion of gear 24 thus minimizing back-lash in the drive and maintaining the support member 26 in the selected position.

Electrical termination for the capacitor 10 is provided through terminals lugs 78 and 80 which are connected respectively to rivets 20 and 22. Wires, printed circuit tabs, bus bars or the like, may be directly soldered or mechanically fixed to the free ends of terminals 78 and 80. In the preferred embodiment the size of the housing 12 is selected to correspond to the size of other modules in conventional use so that the capacitor may be stacked in modular form for use in modern circuit arrangements.

While one particular embodiment of the invention has been described in substantial detail it will be apparent that various forms may be constructed utilizing the principles taught herein. For example, the ground dielectric support 26 may be in various forms, provided only that the two major faces are flat and parallel and a conductive film or foil partially covers one face. The support member 26 may be mounted by various means so that the opposite face cooperates with a corresponding film or foil abutting the opposite face and formed on a flat, concentric surface. The resilient means, here shown as spring clip 28, which urges support member 26 into intimate engagement with the fixed capacitor plate, may be of various forms so long as it performs that function.

Without further elaboration, the foregoing will so fully explain the character of this invention that others may, by applying current knowledge, readily adapt the same for use under varying conditions of service, while retaining certain features which may properly be said to constitute the essential items of novelty involved, which items are intended to be defined and secured by the following claims.

What is claimed is:

1. A variable capacitor comprising a housing, a fixed capacitor plate disposed within said housing, an insulating dielectric support member of uniform predetermined thickness rotatably mounted within said housing and substantially completely enclosed thereby, a second capacitor plate carried by said support member, said fixed capacitor plate and said second capacitor plate with said support member disposed therebetween comprising a variable capacitor, resilient means disposed in said housing and urging said support member into intimate engagement with said fixed capacitor plate, and drive means mounted in said housing, operatively connected to said support member to effect rotation thereof, and having an engageable portion externally disposed in said housing.

2. A variable capacitor comprising a housing, a fixed capacitor plate disposed within said housing, an insulating dielectric support member of uniform predetermined thickness rotatably mounted within said housing and substantially completely enclosed thereby, a second capacitor plate carried by said support member, said fixed capacitor plate and said second capacitor plate with said support member disposed therebetween comprising a variable capacitor, resilient means disposed in said housing and yieldably urging said support member into intimate engagement with said fixed capacitor plate, and drive means mounted in said housing comprising drive gear means operatively connected to said support member to effect rotation thereof and worm gear means rotatably disposed in said housing and in driving engagement with said drive gear means and having an engageable portion externally disposed in said housing.

3. The variable capacitor of claim 1 wherein said drive gear means is freely mounted within a confining circular aperture and said variable capacitor includes a shaft fixed in said housing on which said support member and said resilient means are mounted.

4. A variable capacitor comprising an insulating housing having a recess therein and a transverse aperture communicating with said recess, a cover disposed on said housing and closing said recess to define a cavity, said cavity being defined by at least one substantially flat end wall, a capacitor plate formed on a portion of said end wall, a support member rotatably mounted within said cavity and having two substantially flat, parallel faces, a capacitor electrode carried on one of said faces, the other of said faces being in relatively rotatable contact with said end wall, resilient means mounted on said cover and yieldably urging said support member into intimate engagement with said capacitor plate, electrical connections extending through said housing and connected to said capacitor plate and said capacitor electrode, and drive means disposed in said transverse aperture and being in driving engagement with said support member.

5. A precision variable capacitor comprising a housing defining an internal cavity having one substantially flat wall, a supporting member rotatably disposed within said cavity and having two substantially flat, parallel faces, a fixed capacitor plate carried by said wall, a rotatable capacitor electrode carried on one face of said support member, the other face of said support member being in relatively rotatable contact with said wall, resilient means mounted on said housing and yieldably urging said support member into intimate engagement with said capacitor plate, electrical connection means extending through said housing and connected to said capacitor plate and said capacitor electrode, and drive means for rotating said support member within said housing to vary the relative positions of said capacitor plate and electrode.

6. The variable capacitor of claim 4 wherein said recess is circular and said support member is circular, and including means rotatably supporting said support member in substantially coaxial relationship within said recess.

7. The variable capacitor of claim 6 wherein said drive means includes a drive gear rotatably mounted within said cavity and a worm gear tangentially disposed with respect to said drive gear and rotatably mounted in said housing.

8. The variable capacitor of claim 5 wherein said housing is sealed and said drive means includes an externally engageable portion for rotating said worm gear and in turn said support member.

9. The variable capacitor of claim 5 wherein said support member is a flat ground disc of ceramic material having low conductivity and a high dielectric constant.

10. The variable capacitor of claim 5 including a cover which closes said housing and defines said cavity, said support member and said cover being formed of ceramic material, and ground to define two flat parallel faces, said capacitor plates being disposed on respective faces of said cover and support member.

11. The variable capacitor of claim 5 wherein said support member and said capacitor plate are in intimate contact to the substantial exclusion of air.

12. The variable capacitor of claim 4 wherein a shaft is provided on which said cover, support member and resilient member are assembled together as a unit with the cover and support member being relatively rotatable, said electrical connection being formed on said cover, and said unit being secured on said housing.

References Cited by the Examiner

UNITED STATES PATENTS

| | | |
|---|---|---|
| 2,499,634 | 3/1950 | Ehler. |
| 3,090,021 | 5/1953 | Barnes _____ 317—249 X |
| 3,170,099 | 2/1965 | Sperry _____ 317—249 |
| 3,242,400 | 3/1966 | Miwa. |

LEWIS H. MYERS, *Primary Examiner.*

LARAMIE E. ASKIN, *Examiner.*

E. GOLDBERG, *Assistant Examiner.*